(12) United States Patent
Ask

(10) Patent No.: US 9,533,685 B2
(45) Date of Patent: Jan. 3, 2017

(54) METHOD AND SYSTEM FOR ASSISTING OVERTAKING

(71) Applicant: VOLVO CAR CORPORATION, Gothenburg (SE)

(72) Inventor: Martin Ask, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 14/923,599

(22) Filed: Oct. 27, 2015

(65) Prior Publication Data
US 2016/0121893 A1 May 5, 2016

(30) Foreign Application Priority Data
Nov. 4, 2014 (EP) .................................... 14191588

(51) Int. Cl.
*B60W 30/16* (2012.01)
*B60K 31/00* (2006.01)
(Continued)

(52) U.S. Cl.
CPC ........ *B60W 30/16* (2013.01); *B60W 30/18163* (2013.01); *B60W 2520/10* (2013.01);
(Continued)

(58) Field of Classification Search
CPC ...... B60W 30/16; B60W 30/14; B60W 30/10; B60K 31/0008; G08G 1/16; G08G 13/93; G01S 2014/9325
(Continued)

(56) References Cited

U.S. PATENT DOCUMENTS 6,353,788 B1  3/2002  Baker et al.
2003/0163239 A1*  8/2003  Winner .............. B60K 31/0008
                                                 701/93
(Continued)

FOREIGN PATENT DOCUMENTS

DE  102009033800  3/2010
DE  102011076085  11/2012
(Continued)

OTHER PUBLICATIONS

Extended European Search Report for European Application No. EP 14191588.4, Completed by the European Patent Office, Dated Apr. 21, 2015, 4 Pages.

*Primary Examiner* — Tan Q Nguyen
(74) *Attorney, Agent, or Firm* — Brooks Kushman P.C.

(57) ABSTRACT

A method for assisting overtaking includes determining a first speed of a first vehicle, determining a first distance to a second vehicle in front of the first and a second speed of the second vehicle by a sensor in the first vehicle, determining a second distance to a third vehicle behind the first and a third speed of the third vehicle by a sensor in the first vehicle, determining a first speed change associated with a first driving operation allowing the first vehicle to keep a first safety distance to the second while the third vehicle overtakes the first, determining a second speed change associated with a second driving operation allowing the first vehicle to keep a second safety distance to the third while the first vehicle overtakes the second, comparing the first and second speed changes and performing the driving operation associated with the most favourable speed change.

15 Claims, 4 Drawing Sheets

(51) Int. Cl.
  *B60W 30/18* (2012.01)
  *G08G 1/16* (2006.01)
(52) U.S. Cl.
  CPC ..... *B60W 2550/12* (2013.01); *B60W 2550/14* (2013.01); *B60W 2550/141* (2013.01); *B60W 2550/302* (2013.01); *B60W 2550/308* (2013.01); *B60W 2720/10* (2013.01); *B60W 2750/308* (2013.01)
(58) Field of Classification Search
  USPC .................. 701/96, 93, 41; 340/903, 435
  See application file for complete search history.

(56) References Cited

U.S. PATENT DOCUMENTS

| | | | |
|---|---|---|---|
| 2005/0216172 A1* | 9/2005 | Schroder | B60K 31/0008 701/96 |
| 2014/0176321 A1* | 6/2014 | Chen | B60W 30/14 340/435 |

FOREIGN PATENT DOCUMENTS

| | | |
|---|---|---|
| DE | 102013005248 | 10/2014 |
| KR | 20090128873 | 12/2009 |

* cited by examiner

METHOD AND SYSTEM FOR ASSISTING OVERTAKING

CROSS-REFERENCE TO RELATED APPLICATIONS

This application claims foreign priority benefits under 35 U.S.C. §119(a)-(d) to European patent application number EP 14191588.4, filed Nov. 4, 2014, which is incorporated by reference in its entirety.

TECHNICAL FIELD

The present disclosure relates to a method and a system for assisting overtaking

BACKGROUND

When a driver of a vehicle approaches a slower-driving vehicle in front the own vehicle he/she may want to overtake the slower-driving vehicle.

Document US 2003/0163239 discloses a method and a device for assisting overtaking The method involves taking into account vehicles in the overtaking lane and regulating the own vehicle to an increased overtaking speed if the traffic situation detected by sensors or a driver intervention causes a desire to overtake. Distances to vehicles in the overtaking lane are measured and the overtaking speed computed depending on the distances of the vehicle to be overtaken and at least the immediately preceding vehicle in the overtaking lane.

Document US 2003/0163239 thus discloses a method wherein vehicles travelling in front of the own vehicle are taken into account. This includes both the vehicle to overtake, as well as any vehicle travelling in an overtaking lane beside the vehicle to overtake.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, in a first embodiment of the present disclosure there is provided a method for assisting overtaking The method comprises determining a first speed of a first vehicle, determining a first distance to a second vehicle travelling in front of the first vehicle and a second speed of the second vehicle by at least one first sensor comprised in the first vehicle, determining that the second speed is less than the first speed, determining a second distance to a third vehicle travelling behind the first vehicle and a third speed of the third vehicle by at least one second sensor comprised in the first vehicle, determining that the third speed is higher than the first speed, determining a first speed change of the first vehicle, the first speed change being associated with a first driving operation allowing the first vehicle to keep at least a selectable first safety distance to the second vehicle while the third vehicle overtakes the first vehicle, determining a second speed change of the first vehicle, the second speed change being associated with a second driving operation allowing the first vehicle to keep at least a selectable second safety distance to the third vehicle while the first vehicle overtakes the second vehicle, comparing the first speed change and the second speed change to find a most favourable speed change, performing the driving operation associated with the most favourable speed change for the first vehicle.

The first vehicle may perform either the first or the second driving operation. Which one to perform is selected based on which of said first or second speed change is the most favourable speed change for the first vehicle.

It is only relevant for the first vehicle to overtake the second vehicle if its speed, i.e. the first speed, is higher than the second speed. Correspondingly, it is only relevant for the third vehicle to overtake the first vehicle if its speed, i.e. the third speed, is higher than the first speed.

A traffic scenario, in which the method as described herein is applicable, could comprise that the third vehicle is approaching the first vehicle from behind, while the first vehicle is approaching the second vehicle. Since the third vehicle has a higher speed than both the first vehicle and the second vehicle, the third vehicle, or rather its driver or an at least partly automatic driving system of the third vehicle, wants to overtake both of them, when the third vehicle has caught up with the first vehicle. A first option for the first vehicle, or rather for its driver or an at least partly automatic driving system of the first vehicle, is then to slow down behind the second vehicle, while the third vehicle overtakes the first vehicle and potentially the second vehicle. This corresponds to the first vehicle performing the first driving operation described above. A second option for the first vehicle is to overtake the second vehicle before the third vehicle has caught up with the first vehicle. This corresponds to the first vehicle performing the second driving operation described above, which is an overtaking operation wherein the first vehicle overtakes the second vehicle. The first vehicle may then hinder the third vehicle, when the first vehicle overtakes the second vehicle. There may arise such a short distance between the first vehicle and the third vehicle, that it is not safe from a traffic point of view. The first vehicle may therefore choose to speed up during the overtaking operation, corresponding to the second speed change described above.

The first vehicle may be in the same lane as the second vehicle or in an adjacent lane, e.g. an overtaking lane. The third vehicle third vehicle may be in the same lane as the first vehicle or in an adjacent lane, e.g. in an overtaking lane, if the first vehicle is in the normal running lane.

The third vehicle may overtake both the first and second vehicles in the same overtaking operation, or the third vehicle may first overtake the first vehicle, and thereafter overtake the second vehicle in a separate overtaking operation. Whether the third vehicle overtakes one or both of the first and second vehicles is out of control of the driver or the driving system of the first vehicle.

If the third vehicle overtakes both the first and second vehicles, the first vehicle may follow the third vehicle when it overtakes the second vehicle, such that the first vehicle overtakes the second vehicle directly following the third vehicle. Hence, the first vehicle does not have to wait until the third vehicle has finished overtaking the second vehicle before the first vehicle itself initiates an overtaking operation of the second vehicle.

The determination of the first and/or second speed change may be made assuming that the first, second and/or third vehicle travel at constant speed during the above-mentioned first and second driving operations.

The method as described herein hence provides a method for assisting overtaking, which method not only takes vehicles travelling in front of the own vehicle into account, but also takes faster traffic coming from behind into account.

It is desirable that the first vehicle starts its overtaking of the second vehicle at a suitable point in time. The first vehicle should desirably not start the overtaking operation too late, such that it has to interrupt the overtaking operation and unnecessarily slow down behind the second vehicle, e.g. to let the third vehicle pass. On the other hand, the first vehicle should desirably not overtake the second vehicle in such a way that the first vehicle hinders faster traffic coming from behind, e.g. the third vehicle. The third vehicle is e.g. hindered if it has to slow down and/or to brake. The method and the system as described herein will help the first vehicle to choose a suitable point in time for performing the overtaking of the second vehicle with a minimal negative influence on the traffic flow. The point in time is further chosen so that it also makes it possible for the other vehicles involved, here represented by the second vehicle and the third vehicle, to keep as constant speed as possible. It is generally advantageous to keep as constant speed as possible, since in that case less energy is used as compared to a vehicle having the same average speed but changing between decelerating and accelerating. It is also beneficial from a traffic safety point of view. It may for example help the vehicle not to exceed the speed limit. Predictable traffic behaviour, e.g. not changing the speed too much, also contributes to traffic safety.

The most favourable speed change may be selected as the speed change resulting in the smallest speed change for the first vehicle. As an alternative, or as a complement, the most favourable speed change may be selected such that the use of brakes is avoided, thus making a speed increase more favourable than a corresponding speed decrease. As yet an alternative, or as a complement, the most favourable speed change may be selected such that energy consumption is reduced for the first vehicle. Further, the most favourable speed change may be selected such that energy consumption is reduced as seen as a sum of the vehicles involved, i.e. the first vehicle, the second vehicle and the third vehicle.

The first vehicle may overtake the second vehicle without hindering one or more vehicles coming from behind. Such vehicles would be hindered if they had to slow down and/or to brake, which, as mentioned, may be avoided.

The method may comprise
  determining an overtaking time for the first vehicle to overtake the second vehicle,
  determining a catch-up time for the third vehicle to catch up with the first vehicle,
  performing an overtaking operation, wherein the first vehicle overtakes the second vehicle if the catch up time is equal to or larger than the overtaking time.

An overtaking time for the first vehicle to overtake the second vehicle may be determined based on the first speed of the first vehicle, the first distance to the second vehicle and the second speed of the second vehicle. It may be assumed that the first and second vehicle travel at constant speed during the overtaking operation when determining the overtaking time.

A catch-up time for the third vehicle to catch up with the first vehicle may be determined based on the first speed of the first vehicle, the second distance to the third vehicle and the third speed of the third vehicle. It may be assumed that the first and third vehicle travel at constant speed during the catching-up when determining the catch-up time.

It is only suitable for the first vehicle to overtake the second vehicle if the catch-up time is equal to or larger than the overtaking time. The term catch up as used herein denotes that the third vehicle reaches the second safety distance in relation to the first vehicle.

The first safety distance and/or the second safety distance may be related to a distance in metres and/or a distance in time. The safety distance may be selected such that the vehicle behind is able to brake without colliding with the vehicle in front in case the vehicle in front suddenly brakes. The first safety distance and/or the second safety distance may be selected based on the first, second and/or third speeds, e.g. the higher speed the longer safety distance. As an alternative, or as a complement, the first safety distance and/or the second safety distance may be selected based on environmental factors, such as road conditions, weather, time of day and/or darkness. It may for example be appropriate to use a longer safety distance if precipitation is falling or if the road is slippery. The safety distance may be adapted to the amount of traffic and/or to if there is risk of a child or a wild animal running out on the road.

The method may comprise that the second driving operation of the first vehicle overtaking the second vehicle is performed at a speed of the first vehicle, which is within the first speed +/−20%, within the first speed +/−10%, within the first speed +/−5%, or within the first speed +/−2%. The goal may be to use substantially the same speed, such that substantially no speed change is needed.

The method may comprise
  determining any on-coming traffic, which would meet the first vehicle if overtaking the second vehicle, and initiating overtaking the second vehicle if no such on-going traffic is determined.

The at least one first sensor of the first vehicle may be utilized to also detect oncoming traffic. The suitable point in time is in that case not only considering the speeds of the vehicles travelling in the same direction as the first vehicle, as described above, but also considers on-coming traffic, such that the overtaking operation can be made in a safe way. If on-coming traffic is detected, which would interfere with the overtaking operation, the first vehicle waits behind the second vehicle. This could occur on a road having traffic in both directions. If on-coming traffic is detected in the vicinity of the second vehicle, which on-coming traffic would interfere with an overtaking, the first vehicle may wait behind the second vehicle, until the oncoming traffic has passed. If the on-coming traffic is detected further away, there may be enough time for the first vehicle to perform the overtaking operation before the on-coming traffic actually meets the first vehicle and/or the second vehicle.

In a second embodiment of the present disclosure, there is provided a system for assisting overtaking The system is adapted to be comprised in a first vehicle and comprises
  at least one first sensor, adapted to determine a first distance to a second vehicle travelling in front of the first vehicle and a second speed of the second vehicle,
  at least one second sensor, adapted to determine a second distance to a third vehicle travelling behind the first vehicle and a third speed of the third vehicle,
  a speed determining unit, adapted to determine a first speed of the first vehicle, and
  a processor.

The processor is adapted to
determine a first speed change of the first vehicle associated with an operation allowing the first vehicle to keep at least a selectable first safety distance to the second vehicle while the third vehicle overtakes the first vehicle,
determine a second speed change of the first vehicle associated with an operation allowing the first vehicle to keep at least a selectable second safety distance to the third vehicle while the first vehicle overtakes the second vehicle,
compare the first speed change and the second speed change to find a most favourable speed change.

The first and/or the second sensor may comprise a radar, lidar camera, stereo camera and/or an IR camera. The first and/or the second sensor may determine absolute speed or speed in relation to the first vehicle.

The speed determining unit for determining the speed of the first vehicle hosting the system may be a speed indicator comprised in the vehicle.

The speeds of the own vehicle hosting the system, the vehicle in front and the vehicle behind, i.e. of the first, second vehicle and third vehicles, may be determined continuously, or intermittently with a short interval.

The system as described herein may further comprise a subsystem for at least partially automated driving, the subsystem being adapted to control the first speed of the first vehicle at least while the first vehicle overtakes the second vehicle. The first vehicle may run in a fully or partly automated mode.

The system may comprise at least one sensor adapted to detect oncoming traffic. The sensor may comprise a radar, lidar camera, stereo camera and/or an IR camera. The sensor may determine absolute speed or speed in relation to the first vehicle. The at least one sensor adapted to detect oncoming traffic may be the same as the at least one first sensor adapted to determine the distance to and the speed of the second vehicle travelling in front of the first vehicle.

As an option, the system may be able to determine speeds for more than one vehicle in front of the own vehicle, and/or more than one vehicle behind the own vehicle. It may e.g. be on option to overtake two or more vehicles in the same overtaking operation. The at least one first sensor may be adapted to determine a distance to and a speed of more than one vehicle travelling in front of the first vehicle and/or the at least one second sensor may be adapted to determine a distance to and a speed of more than one vehicle travelling behind the first vehicle.

The system may further comprise a communication unit adapted to communicate information to a driver, e.g. a display unit, which may form part of an infotainment system. The driver may for example be informed that it is suitable or unsuitable to perform the overtaking operation at a certain point in time. The communication unit may utilize text information, colour information, sound information and/or haptic information. It may e.g. show red colour, send an alarm and/or vibrate the steering wheel if an overtaking is unsuitable. The communication may be enhanced, the more unsuitable the overtaking operation is.

In a third embodiment of the present disclosure there is provided a vehicle comprising a system as described herein. The vehicle corresponds to the first vehicle in the method and the system described herein.

The driving operation may be performed by a driver of the first vehicle. The driver may for example be informed by the system as described herein that it is suitable or unsuitable to perform the driving operation at a certain point in time. As an alternative, or as a complement, the driving operation may be performed by a driving system of the vehicle adapted for at least partially automated driving, e.g. a driver assist system assisting the driver with the speed, while the driver performs the necessary steering operations. The driving system may at least perform the overtaking operation.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
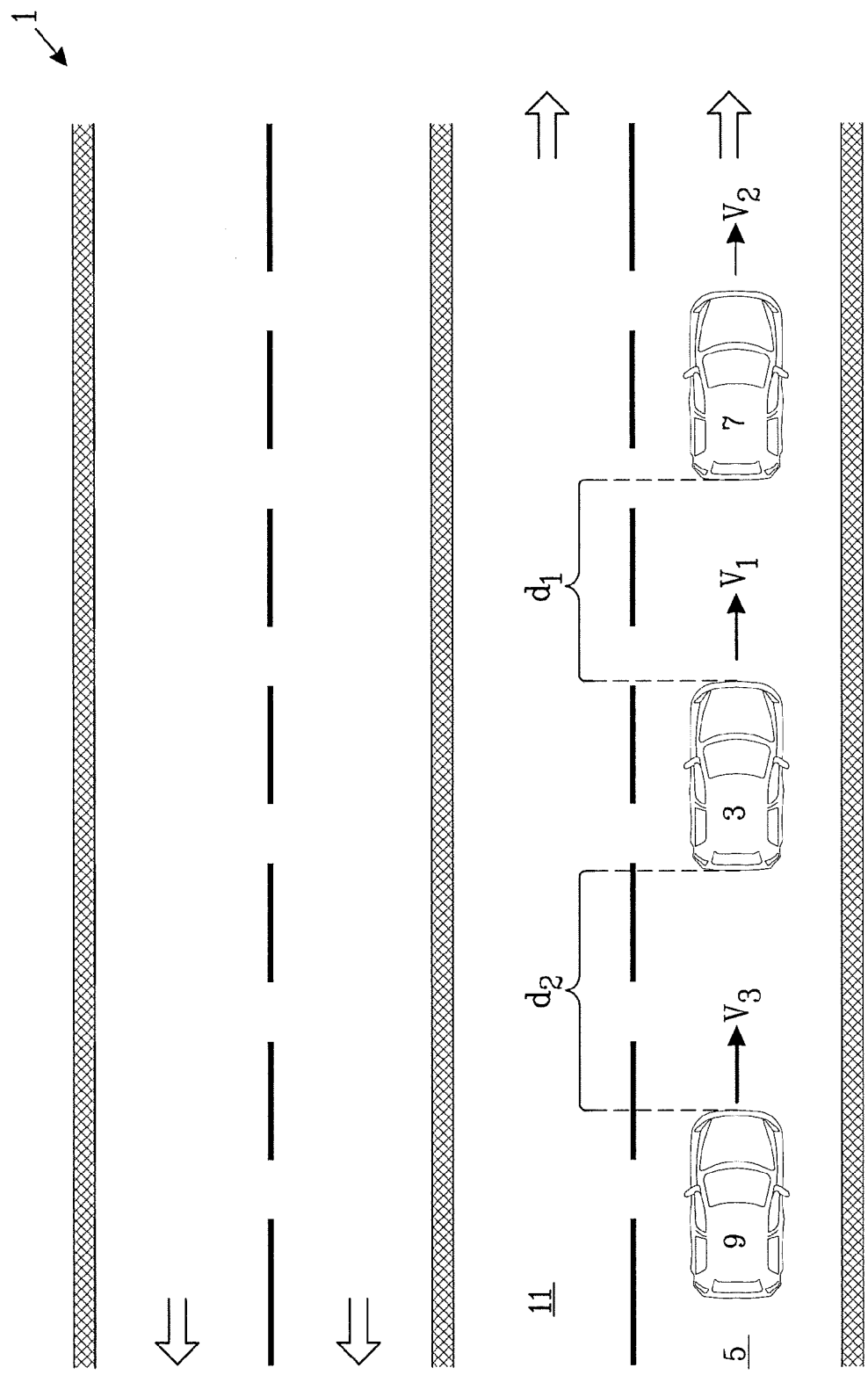
FIG. 1 illustrates a first possible traffic scenario.

FIG. 1 illustrates a first possible traffic scenario occurring on a public road 1. The public road 1 may comprise one or more lanes in each direction. If the public road 1 is a highway, as illustrated in FIG. 1, it usually comprises at least two lanes in each direction.

A first vehicle 3 is travelling at a first speed $v_1$. The first vehicle 3 is hosting a system according to the disclosure, which system is further described below in conjunction with FIG. 2. In front of the first vehicle 3, but in the same lane 5, there is a second vehicle 7 travelling at a second speed $v_2$. There is a first distance $d_1$ between the first vehicle 3 and the second vehicle 7. It is assumed that the first vehicle 3 travels faster than the second vehicle 7, such that the first distance $d_1$ gradually decreases. Eventually, the first vehicle 3, or rather its driver or an at least partly automatic driving system of the first vehicle 3, may want to overtake the second vehicle 7.

There is also a third vehicle 9 travelling at a third speed $v_3$. There is a second distance $d_2$ between the third vehicle 9 and the first vehicle 3. It is assumed that the third vehicle 9 travels faster than the first vehicle 3, such that the second distance $d_2$ gradually decreases. Eventually, the third vehicle 9, or rather its driver or an at least partly automatic driving system of the third vehicle 9, may want to overtake the first vehicle 3 and the second vehicle 7. The third vehicle 9 may run in the same lane 5 as the first vehicle 3 or in an overtaking lane 11.

The first vehicle 3 tries to keep its speed as constant as possible. The first vehicle 3 also wants to perform the overtaking operation of the second vehicle 7 with as little speed change as possible.

If the first vehicle 3 and the second vehicle 7 are alone on the road, the first vehicle 3 can overtake the second vehicle 7 without any speed change at all. It is then assumed that there is no on-coming traffic, which needs to be considered during the overtaking operation.

However, in the scenario of FIG. 1, the third vehicle 9 is approaching from behind. Since it has a higher speed than both the first vehicle 3 and the second vehicle 7, the third vehicle 9 wants to overtake both of them, when it has caught up with the first vehicle 3. A first option for the first vehicle 3 is then to slow down behind the second vehicle 7, while the third vehicle 9 overtakes the first vehicle 3. A second option for the first vehicle 3 is to overtake the second vehicle 7 before the third vehicle 9 has caught up with the first vehicle 3. If the first vehicle 3 keeps its speed constant at the first speed $v_1$, the first vehicle 3 may then hinder the third vehicle 9. There may arise such a short distance between the first vehicle 3 and the third vehicle 9, that it is not safe from a traffic point of view. The first vehicle 3 may therefore choose to speed up during the overtaking operation.

The first vehicle 3 should be able to keep as constant speed as possible. It is therefore desirable that the first vehicle 3 starts its overtaking of the second vehicle 7 at a suitable point in time. It should desirably not start the overtaking operation too late, such that the first vehicle 3 has to interrupt the overtaking operation and slow down behind the second vehicle 7, e.g. to let the third vehicle 9 pass. On the other hand, the first vehicle 3 should desirably not overtake the second vehicle 7 in such a way that the first vehicle 3 hinders faster traffic coming from behind, here illustrated as the third vehicle 9. The method and the system of the present disclosure will help the first vehicle 3 to choose a suitable point in time for performing the overtaking operation with minimal negative influence on the traffic flow. The point in time is further chosen so that it also makes it possible for the other vehicles involved, here represented by the second vehicle 7 and the third vehicle 9, to keep as constant speed as possible. It is generally advantageous to keep as constant speed as possible, since in that case less energy is used as compared to a vehicle having the same average speed but changing between decelerating and accelerating. It is also beneficial from a traffic safety point of view. It may for example help the vehicle not to exceed the speed limit. Predictable traffic behaviour, e.g. not changing the speed too much, also contributes to traffic safety.

In the traffic scenario of FIG. 1, an overtaking time for the first vehicle 3 to overtake the second vehicle 7 may be determined based on the first speed $v_1$ of the first vehicle 3, the first distance $d_1$ to the second vehicle 7 and the second speed $v_2$ of the second vehicle 7. It may be assumed that the first 3 and second vehicle 7 travel at constant speed during the overtaking operation when determining the overtaking time.

A catch-up time for the third vehicle 9 to catch up with the first vehicle 3 may be determined based on the first speed $v_1$ of the first vehicle 3, the second distance $d_2$ to the third vehicle 9 and the third speed $v_3$ of the third vehicle 9. It may be assumed that the first 3 and third vehicle 9 travel at constant speed during the overtaking operation when determining the catch-up time. In that case, it is only suitable for the first vehicle 3 to overtake the second vehicle 7 if the catch-up time is equal to or larger than the overtaking time.

Figure 2:
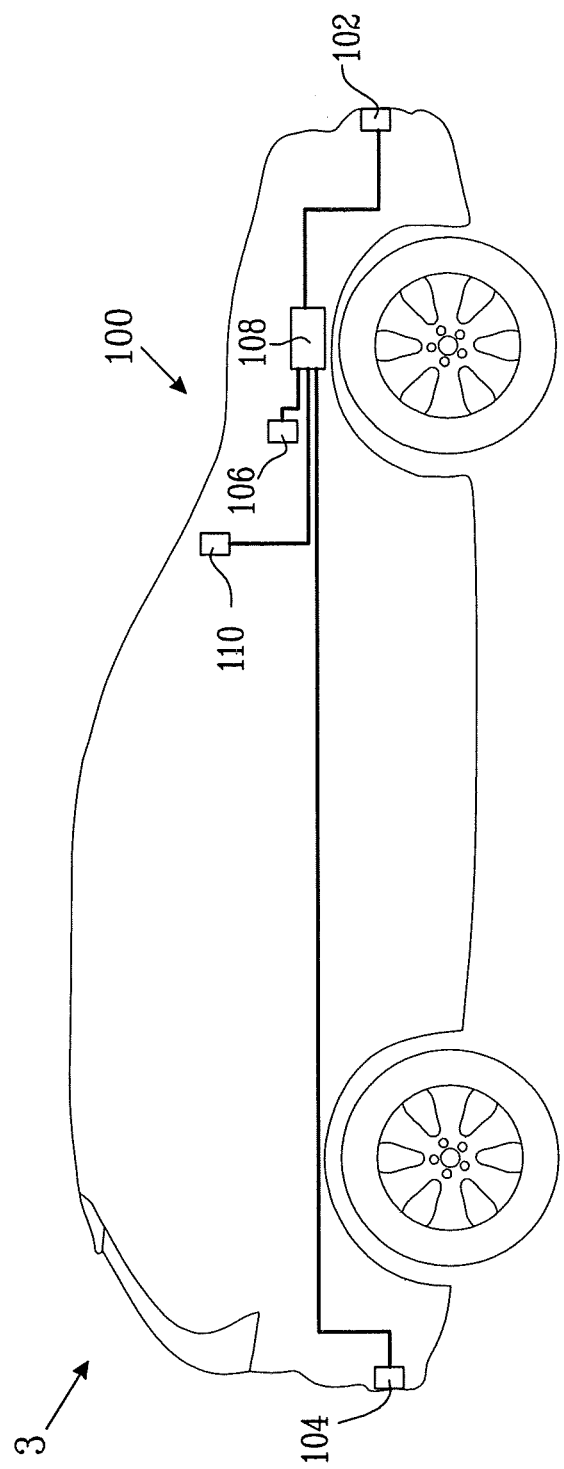
FIG. 2 illustrates schematically a vehicle with a system according to the disclosure.

The first vehicle 3, below called the own vehicle, is hosting a system 100 according to the disclosure, see FIG. 2. The system 100 comprises at least one first sensor 102, which is adapted to determine a distance to and a speed of the second vehicle 7 travelling in front of the first vehicle 3. In the scenario of FIG. 1, the at least one first sensor 102 is utilized to measure the second speed $v_2$ of the second vehicle 7 and the first distance $d_1$ between the first vehicle 3 and the second vehicle 7. The at least one first sensor 102 may comprise a radar, lidar camera, stereo camera and/or an IR camera. The at least one first sensor 102 may determine absolute speed or speed in relation to the first vehicle 3.

The system 100 comprises at least one second sensor 104, which is adapted to determine a distance to and a speed of a vehicle travelling behind the first vehicle 3. In the scenario of FIG. 1, the at least one second sensor 104 is utilized to measure the third speed $v_3$ of the third vehicle 9 and the second distance $d_2$ between the first vehicle 3 and the third vehicle 9. The at least one second sensor 104 may comprise a radar, lidar camera, stereo camera and/or an IR camera. The at least one second sensor 104 may determine absolute speed or speed in relation to the first vehicle 3.

The system 100 further comprises a speed determining unit 106 for determining the speed of the first vehicle 3 hosting the system 100, e.g. a speed indicator comprised in the vehicle 3.

Data from the at least one first sensor 102, the at least one second sensor 104 and the speed determining unit 106 are sent to a processor 108, which may be associated with a memory for storing computer executable instructions for performing functions and/or operations including those described herein. The system 100 may further comprise a communication unit for communication to the driver, e.g. a display unit 110 adapted to display information to a user of the vehicle 3. The processor 108 is utilized to evaluate data sent from the sensors, 102, 104. The processor 108 is adapted to —determine a first speed change of the first vehicle 3 associated with a first driving operation allowing the first vehicle 3 to keep at least a selectable first safety distance to the second vehicle 7 while the third vehicle 9 overtakes the first vehicle 3, —determine a second speed change of the first vehicle 3 being associated with a second driving operation allowing the first vehicle 3 to keep at least a selectable second safety distance to the third vehicle 9 while the first vehicle 3 overtakes the second vehicle 7, —compare the first speed change and the second speed change to find a most favourable speed change.

In the illustrated traffic scenario above, the most favourable speed change is selected as the speed change resulting in the smallest speed change for the first vehicle 3. As an alternative, or as a complement, the most favourable speed change may be selected such that the use of brakes is avoided, thus making a speed increase more favourable than a corresponding speed decrease. As yet an alternative, or as a complement, the most favourable speed change may be selected such that energy consumption is reduced for the first vehicle 3. Further, the most favourable speed change may be selected such that energy consumption is reduced as seen as a sum of the vehicles involved, i.e. the first vehicle 3, the second vehicle 7 and the third vehicle 9.

The speeds of the own vehicle 3, the vehicle in front 7 and the vehicle behind 9 may be measured continuously, or intermittently with a short interval. As an option, the system 100 may be able to determine speeds for more than one vehicle in front of the own vehicle 3, and/or more than one vehicle behind the own vehicle 3. It may e.g. be on option to overtake two or more vehicles in the same overtaking operation.

Figure 3:
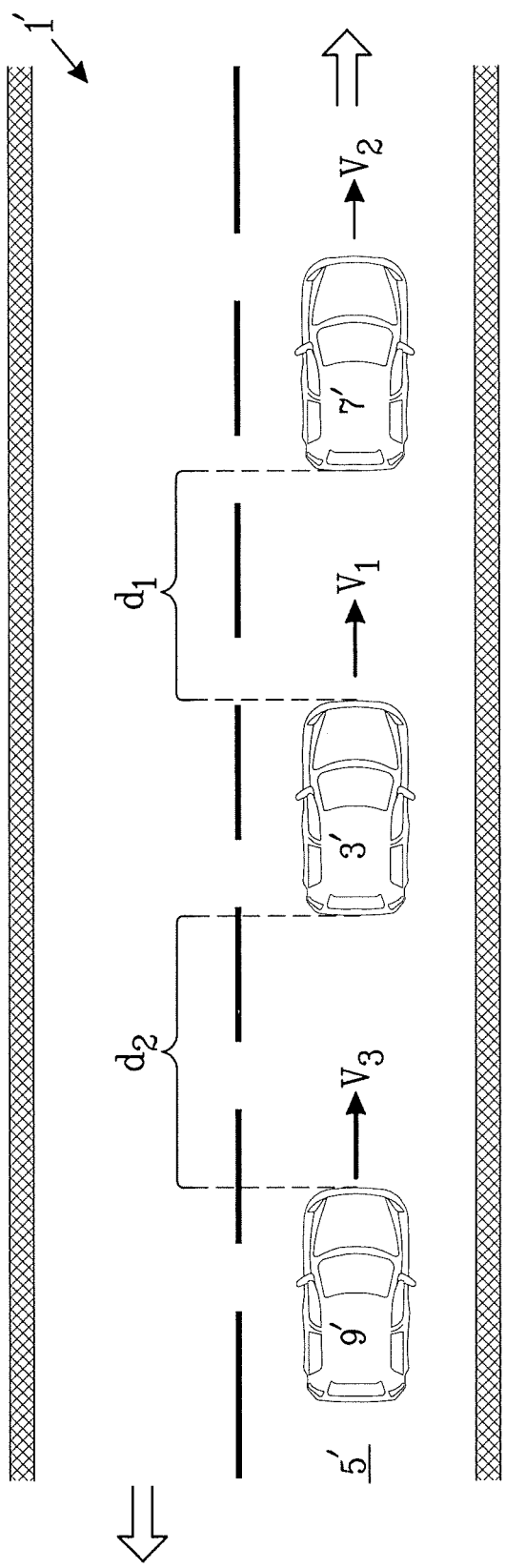
FIG. 3 illustrates a second possible traffic scenario.

The method and system according to the disclosure are also applicable if travelling on a public road 1', with only one lane 5' in each direction. See FIG. 3 illustrating a second possible traffic scenario. However, in that case oncoming traffic should be considered when performing an overtaking operation. The at least one first sensor 102 of the system 100 may be utilized to also detect oncoming traffic. The suitable point in time is in that case not only taking into account the speeds of the vehicles 3', 5', 7' travelling in the same direction as the vehicle 3' hosting the system 100, as described above in conjunction with FIG. 1, but also involves considering on-coming traffic, such that the overtaking operation can be performed in a safe way. If oncoming traffic is detected in the vicinity of the second vehicle 7, which on-coming traffic would interfere with an overtaking, the first vehicle 3 waits behind the second vehicle 7, until the oncoming traffic has passed. If the on-coming traffic is detected further away, there may be enough time for the first vehicle 3 to perform the overtaking operation before the on-coming traffic actually meets the first vehicle 3 and/or the second vehicle 7.

The driving operation may be performed by a driver of the vehicle 3, 3' hosting the system 100, e.g. based on information given on the display unit 110. The driver may for example be informed that it is suitable or unsuitable to perform the overtaking operation at a certain point in time. As an alternative, or as a complement, the driving operation may be performed by a driving system of the vehicle 3, 3' adapted for at least partially automated driving, e.g. a driver assist system assisting the driver with the speed, while the driver steers himself/herself. The driving system may at least perform the overtaking operation.

Figure 4:
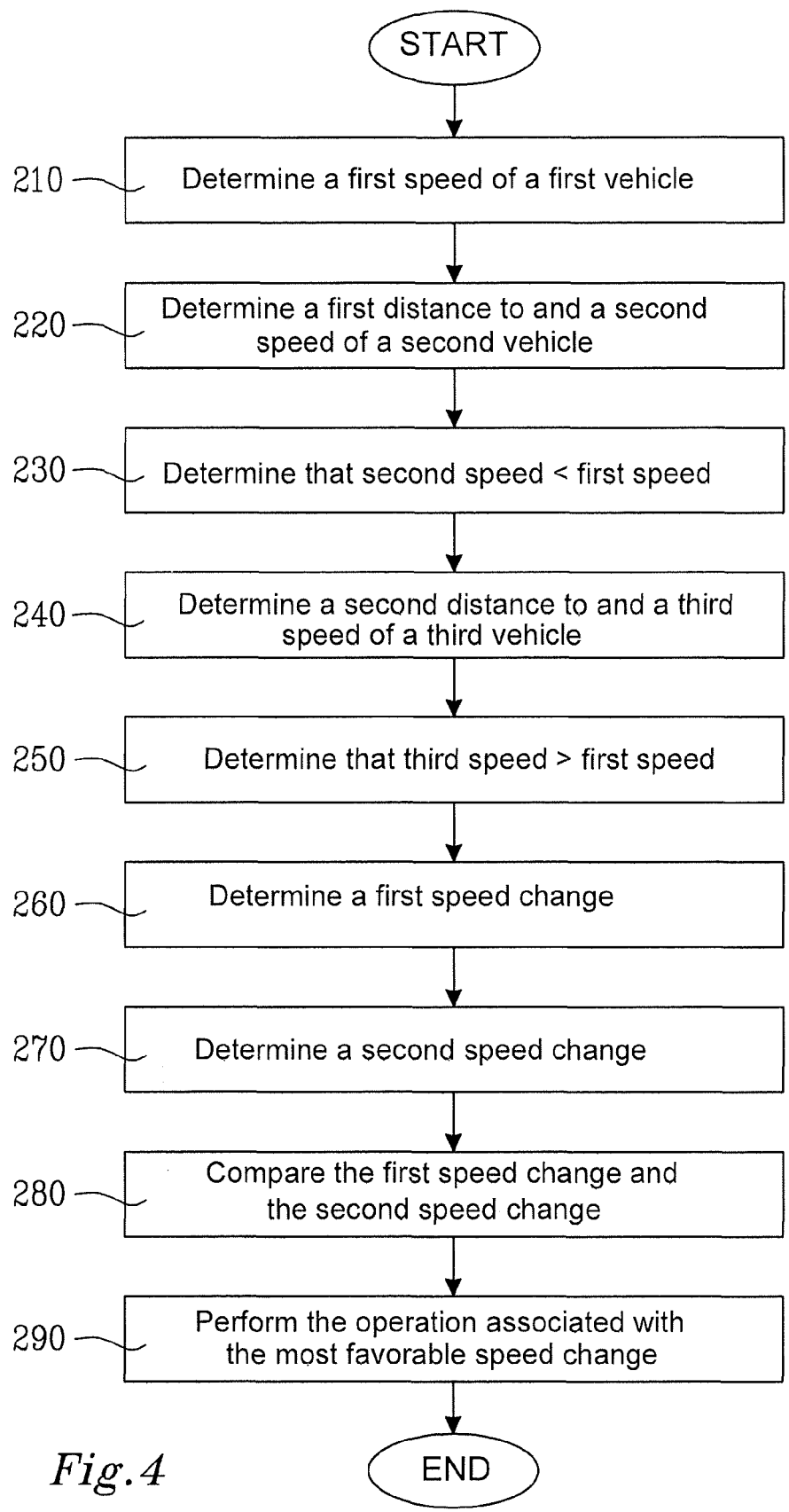
FIG. 4 is a flowchart of a method according to the disclosure.

FIG. 4 is a flowchart of a method according to the disclosure. The method comprises 210: Determining a first speed of a first vehicle.

220: Determining a first distance to a second vehicle travelling in front of the first vehicle and a second speed of the second vehicle by at least one first sensor comprised in the first vehicle.

230: Determining that the second speed is less than the first speed.

240: Determining a second distance to a third vehicle travelling behind the first vehicle and a third speed of the third vehicle by at least one second sensor comprised in the first vehicle.

250: Determining that the third speed is higher than the first speed.

260: Determining a first speed change of the first vehicle, the first speed change being associated with a first driving operation allowing the first vehicle to keep at least a selectable first safety distance to the second vehicle while the third vehicle overtakes the first vehicle.

270: Determining a second speed change of the first vehicle, the second speed change being associated with a second driving operation allowing the first vehicle to keep at least a selectable second safety distance to the third vehicle while the first vehicle overtakes the second vehicle.

280: Comparing the first speed change and the second speed change to find a most favourable speed change.

290: Performing the driving operation associated with the most favourable speed change for the first vehicle.

The method may comprise determining an overtaking time for the first vehicle to overtake the second vehicle, determining a catch-up time for the third vehicle to catch up with the first vehicle, performing an overtaking operation, wherein the first vehicle overtakes the second vehicle if the catch up time is equal to or larger than the overtaking time.

The method may comprise determining any on-coming traffic, which would meet the first vehicle if overtaking the second vehicle, and initiating overtaking the second vehicle if no such on-going traffic is determined.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for assisting overtaking, the method comprising:

determining a first speed of a first vehicle;

determining a first distance to a second vehicle travelling in front of the first vehicle and a second speed of the second vehicle by at least one first sensor comprised in the first vehicle;

determining that the second speed is less than the first speed;

determining a second distance to a third vehicle travelling behind the first vehicle and a third speed of the third vehicle by at least one second sensor comprised in the first vehicle;

determining that the third speed is higher than the first speed;

determining a first speed change of the first vehicle, the first speed change being associated with a first driving operation allowing the first vehicle to keep at least a selectable first safety distance to the second vehicle while the third vehicle overtakes the first vehicle;

determining a second speed change of the first vehicle, the second speed change being associated with a second driving operation allowing the first vehicle to keep at least a selectable second safety distance to the third vehicle while the first vehicle overtakes the second vehicle;

comparing the first speed change and the second speed change to find a most favourable speed change; and performing the driving operation associated with the most favourable speed change for the first vehicle.

2. The method according to claim 1 wherein the most favourable speed change is selected as the speed change resulting in the smallest speed change for the first vehicle.

3. The method according to claim 1 wherein the first vehicle overtakes the second vehicle without hindering one or more vehicles coming from behind.

4. The method according to claim 1 further comprising;

determining an overtaking time for the first vehicle to overtake the second vehicle;

determining a catch-up time for the third vehicle to catch up with the first vehicle; and performing an overtaking operation, wherein the first vehicle overtakes the second vehicle if the catch up time is equal to or larger than the overtaking time.

5. The method according to claim 1 wherein the first safety distance and/or the second safety distance is related to a distance in metres and/or a distance in time.

6. The method according to claim 1 wherein the first safety distance and/or the second safety distance is selected based on the first, second and/or third speeds.

7. The method according to claim 1 wherein the first safety distance and/or the second safety distance is selected based on environmental factors, such as road conditions, weather, time of day and/or darkness.

8. The method according to claim 1 wherein the second driving operation of the first vehicle overtaking the second vehicle is performed at a speed of the first vehicle which is within the first speed +/−2% to +/−20%.

9. The method according to claim 1 further comprising:
determining any on-coming traffic, which would meet the first vehicle if overtaking the second vehicle; and
initiating overtaking the second vehicle if no such on-going traffic is determined.

10. A system for assisting overtaking, the system being adapted to be comprised in a first vehicle, the system comprising:
at least one first sensor adapted to determine a first distance to a second vehicle travelling in front of the first vehicle and a second speed of the second vehicle;
at least one second sensor adapted to determine a second distance to a third vehicle travelling behind the first vehicle and a third speed of the third vehicle;
a speed determining unit adapted to determine a first speed of the first vehicle; and
a processor adapted to
determine a first speed change of the first vehicle associated with a first driving operation allowing the first vehicle to keep at least a selectable first safety distance to the second vehicle while the third vehicle overtakes the first vehicle,
determine a second speed change of the first vehicle associated with a second driving operation allowing the first vehicle to keep at least a selectable second safety distance to the third vehicle while the first vehicle overtakes the second vehicle,
compare the first speed change and the second speed change to find a most favourable speed change.

11. The system according to claim 10 further comprising a subsystem for at least partially automated driving, the subsystem being adapted to control the first speed of the first vehicle at least while the first vehicle overtakes the second vehicle.

12. The system according to claim 10 further comprising at least one sensor adapted to detect oncoming traffic.

13. The system according to claim 10 wherein the at least one first sensor is adapted to determine a distance to and a speed of more than one vehicle travelling in front of the first vehicle and/or the at least one second sensor is adapted to determine a distance to and a speed of more than one vehicle travelling behind the first vehicle.

14. The system according to claim 10 further comprising a communication unit adapted to communicate information to a driver.

15. A vehicle comprising a system according to claim 10.

* * * * *